US008830176B2

(12) United States Patent
Bos et al.

(10) Patent No.: US 8,830,176 B2
(45) Date of Patent: Sep. 9, 2014

(54) MOBILE WIRELESS COMMUNICATIONS DEVICE TO DISPLAY A CURSOR BASED UPON A SELECTED KEYBOARD MODE AND ASSOCIATED METHODS

(75) Inventors: Jeffrey Bos, Waterloo (CA); Leonid Vymenets, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 699 days.

(21) Appl. No.: 12/394,747

(22) Filed: Feb. 27, 2009

(65) Prior Publication Data

US 2010/0220061 A1 Sep. 2, 2010

(51) Int. Cl.
G06F 3/02 (2006.01)
G06F 3/023 (2006.01)
G06F 3/0488 (2013.01)

(52) U.S. Cl.
CPC ......... *G06F 3/0237* (2013.01); *H04M 2250/70* (2013.01); *G06F 3/04886* (2013.01)
USPC ........... 345/169; 345/160; 345/168; 345/173; 345/157; 345/158

(58) Field of Classification Search
USPC .................. 345/158, 157, 173, 169, 168, 160
See application file for complete search history.

(56) References Cited

U.S. PATENT DOCUMENTS

| | | | | |
|---|---|---|---|---|
| 6,307,549 B1 * | 10/2001 | King et al. | ...................... | 715/810 |
| 6,882,335 B2 * | 4/2005 | Saarinen | ........................ | 345/156 |
| 7,477,233 B2 | 1/2009 | Duncan et al. | ................ | 345/156 |
| 7,844,301 B2 * | 11/2010 | Lee et al. | ....................... | 455/566 |
| 8,638,299 B2 * | 1/2014 | Fux et al. | ....................... | 345/169 |
| 2006/0048078 A1 | 3/2006 | Scott | .............................. | 715/864 |
| 2006/0073818 A1 * | 4/2006 | Scott | .............................. | 455/418 |
| 2008/0318635 A1 | 12/2008 | Yoon et al. | | |
| 2009/0167635 A1 * | 7/2009 | Want et al. | ..................... | 345/2.2 |
| 2009/0167716 A1 * | 7/2009 | Wang et al. | ................... | 345/173 |
| 2010/0053089 A1 * | 3/2010 | Kwok et al. | .................. | 345/173 |

OTHER PUBLICATIONS

Anonymous: "Blackberry Storm" Wikipedia, Jun. 21, 2006, http://en.wikipedia.org/wiki/blackberry_storm.
Lendino, Jamie, "Top T-Mobile Dash Tips", http://www.smartdevicecentral.com/article/Top+TMobile+Dash+Tips/199003_1.aspx, Jan. 19, 2007.
Emerson Development LLC, "Caps Lock Software Solution, and Demo Program," http://www.emersondevelopmentllc.com/html/caps_lock.htm, downloaded Jan. 29, 2009.

* cited by examiner

*Primary Examiner* — Jason Olson
*Assistant Examiner* — Linh N Hoffner
(74) *Attorney, Agent, or Firm* — Allen, Dyer, Doppelt, Milbrath & Gilchrist, P.A.

(57) ABSTRACT

A mobile wireless communications device includes a housing to carry a wireless transceiver, a display, a keyboard, and a processor cooperating with the wireless transceiver to perform at least one wireless communication function. The processor also cooperates with the display and the keyboard to permit selection of a keyboard mode from among a plurality of different keyboard modes, at least one of the keyboard modes having multiple different letters selectable from a given key. The processor generates a respective different cursor on the display based upon the selected keyboard mode.

15 Claims, 9 Drawing Sheets

MOBILE WIRELESS COMMUNICATIONS DEVICE TO DISPLAY A CURSOR BASED UPON A SELECTED KEYBOARD MODE AND ASSOCIATED METHODS

TECHNICAL FIELD

The present disclosure relates to the field of mobile wireless communications devices and, more particularly, to the display of cursors on mobile wireless communications devices.

BACKGROUND

Wireless communications systems continue to grow in popularity and have become an integral part of both personal and business communications. Mobile wireless communications devices allow users to place and receive voice calls most anywhere they travel. Moreover, as technology has increased, so too has the functionality of mobile wireless communications devices and the different types of devices available to users. For example, many mobile wireless communications devices now incorporate personal digital assistant (PDA) features such as calendars, address books, task lists, etc. Moreover, such mobile wireless communications devices may also allow users to wirelessly send and receive electronic mail (e-mail) messages and access the Internet via a cellular network and/or a wireless local area network (WLAN), for example.

As a result, users continue to spend more time using their mobile wireless communications devices during the course of a day for performing tasks such as reading emails, reading web pages, sending short message service (SMS) messages, etc., as opposed to early mobile wireless communications devices that were used only for voice calls. The use of a mobile wireless communications device for such functions, however, may present certain inconveniences to a user.

For example, a mobile wireless communications device may not have a full keyboard where each letter of the alphabet is assigned to its own key. Indeed, keys on a keyboard of a mobile wireless communications device may have two or more letters assigned thereto. In addition, the mobile wireless communications device may permit selection of different keyboard modes of the keyboard. These different keyboard modes may alter which letters of the alphabet are assigned to each key or how a desired letter to be entered is selected. For example, mobile wireless communications devices utilizing virtual keyboards on touch screen displays may reconfigure their virtual keyboards so that one, two, three, or even four letters are assigned to each virtual key.

Methods of effectively communicating to a user which keyboard mode a mobile wireless communications device is presently in are therefore desirable.

DETAILED DESCRIPTION

The present description is made with reference to the accompanying drawings, in which various example embodiments are shown. However, many different example embodiments may be used, and thus the description should not be construed as limited to the example embodiments set forth herein. Rather, these example embodiments are provided so that this disclosure will be thorough and complete. Like numbers refer to like elements throughout, and prime and double prime notation is used to indicate similar elements in alternative example embodiments.

The features and objects of the present disclosure are provided by a mobile wireless communications device that may comprise a housing to carry a wireless transceiver, a display, a keyboard, and a processor. The processor may cooperate with the wireless transceiver to perform at least one wireless communication function. The processor may also cooperate with the display and the keyboard to permit selection of a keyboard mode from among a plurality of different keyboard modes, at least one of the keyboard modes having multiple different letters selectable from a given key. The processor may also generate a respective different cursor on the display based upon the selected keyboard mode.

At least one of the keyboard modes may comprise a predictive text entry mode, a non-predictive text entry mode, a number/letter priority keyboard mode, and/or a symbol/letter priority keyboard mode.

The mobile wireless communications device may further comprise at least one input device carried by the housing and the processor may permit selection of the different keyboard modes based upon at least one of the keyboard and the at least one input device. The mobile wireless communications device may further comprise a device orientation sensor carried by the housing and the processor may permit selection of the different keyboard modes based upon the device orientation sensor.

The cursor may comprise a text cursor. The cursor may additionally or alternatively comprise a pointing cursor.

A method aspect is directed to a method of displaying a cursor on a display of a mobile wireless communications device comprising a keyboard, a processor, and a wireless transceiver cooperating with the processor to perform at least one wireless communication function. The method may comprise permitting selection of a keyboard mode of the keyboard from among a plurality of different keyboard modes. The method may further include generating a respective different cursor on the display based upon the selected keyboard mode.

With reference to FIGS. 1-4, a communications system 10 including a mobile wireless communications device 12 according to the present example embodiment is now described. The communications system 10 includes a wireless network 20 that may typically be provided by a cellular telephone network. The mobile wireless communications device 12 comprises a processor 17 coupled to a display 13, a wireless transceiver 14, a memory 15, an input device 16, and a keyboard 18. The memory may be volatile memory, such as RAM, or non-volatile memory, such as flash RAM or a hard drive. The input device 16 may be one or more keys, a thumbwheel, or a trackball, for example. The input device 16 may also be a microphone or a wireless receiver (e.g. bluetooth), as will be appreciated by those of skill in the art. The keyboard 18 may be a conventional keyboard with a plurality of buttons, or may be a virtual keyboard displayed on a touch sensitive display. Of course, the display 13 may be a touch sensitive screen and portions thereof may therefore serve as the input device 16.

Figure 1:
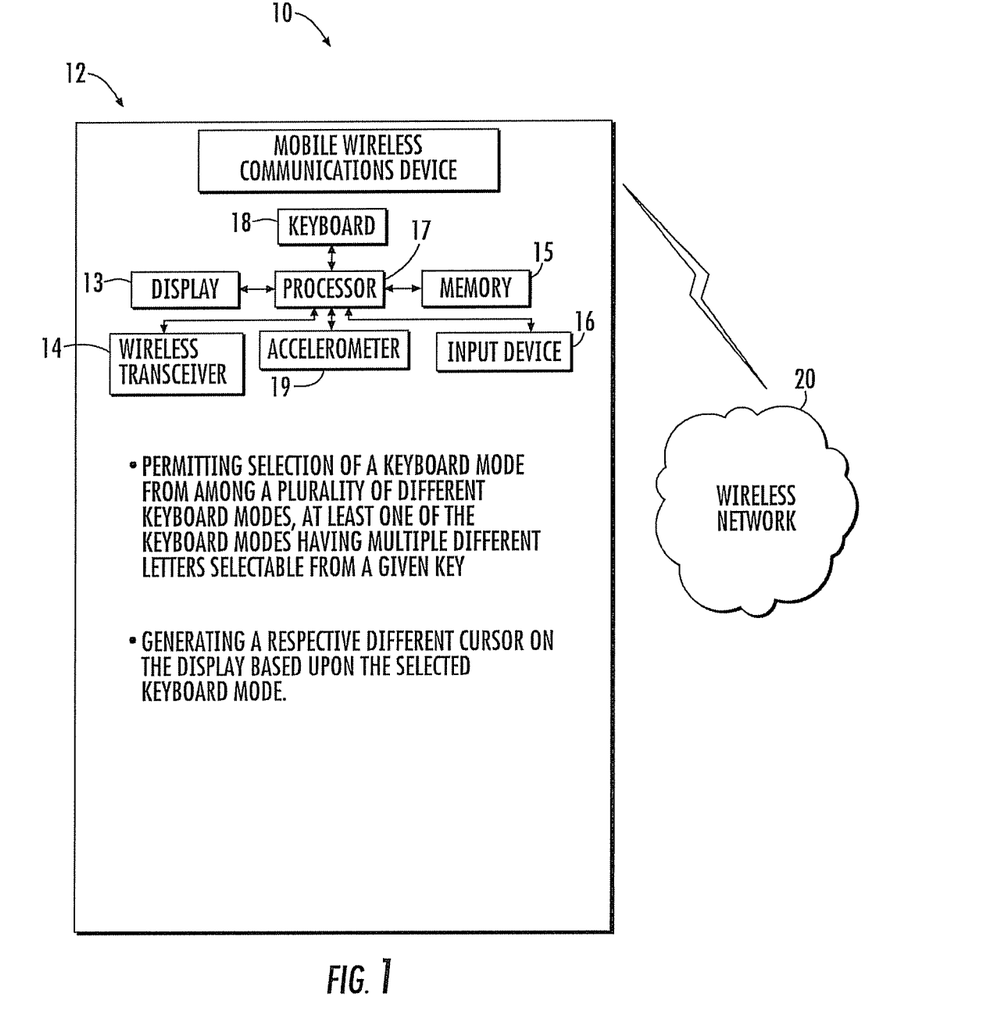
FIG. 1 is a schematic block diagram of a communications system including a mobile wireless communications device in accordance with an example embodiment of the present disclosure.

In addition, the mobile wireless communications device 12 includes a rechargeable battery (not shown), and an orientation sensor 19 (illustratively an accelerometer) to cooperate with the processor 17 to determine a physical orientation of the mobile wireless communication device 12. The portable housing 21 carries the display 13, wireless transceiver 14, memory 15, input device 16, processor 17, keyboard 18, and accelerometer 19.

The processor 17 cooperates with the wireless transceiver 14 to perform at least one wireless communication function. For example, the processor 17 may cooperate with the wireless transceiver 14 to place a voice call or to access the Internet.

Figure 2:
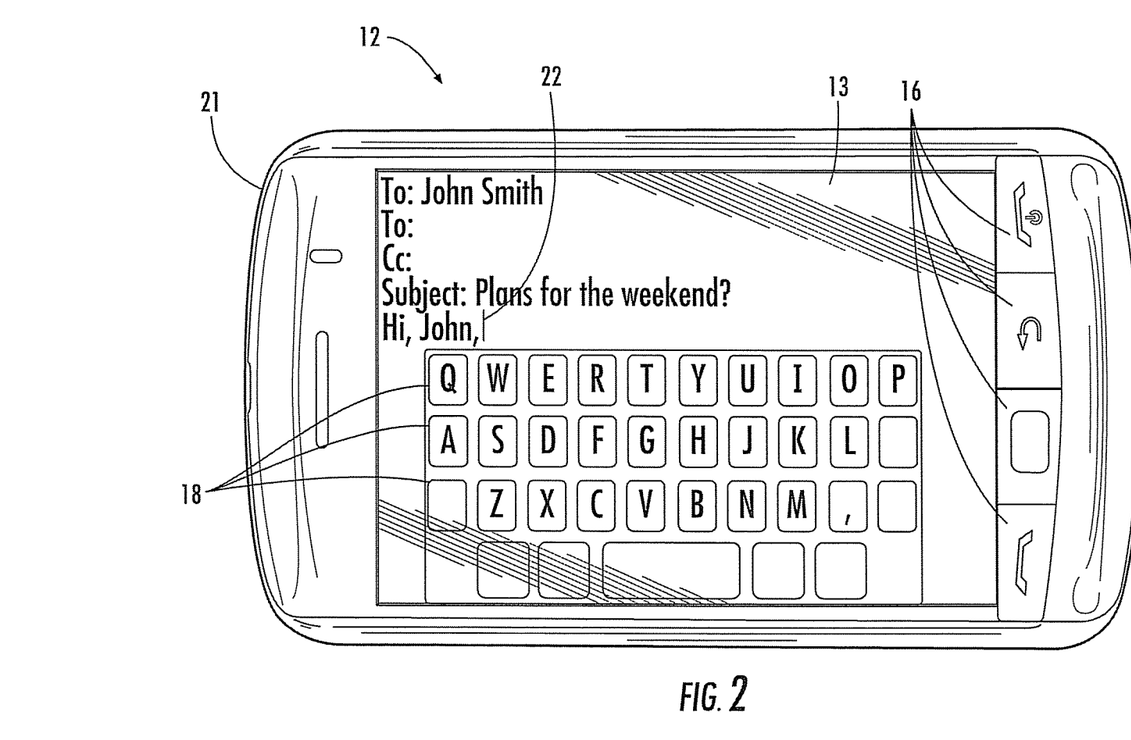
FIG. 2 shows the mobile wireless communications device of FIG. 1 in a non-predictive keyboard mode and displaying a cursor based thereupon.
Figure 3:
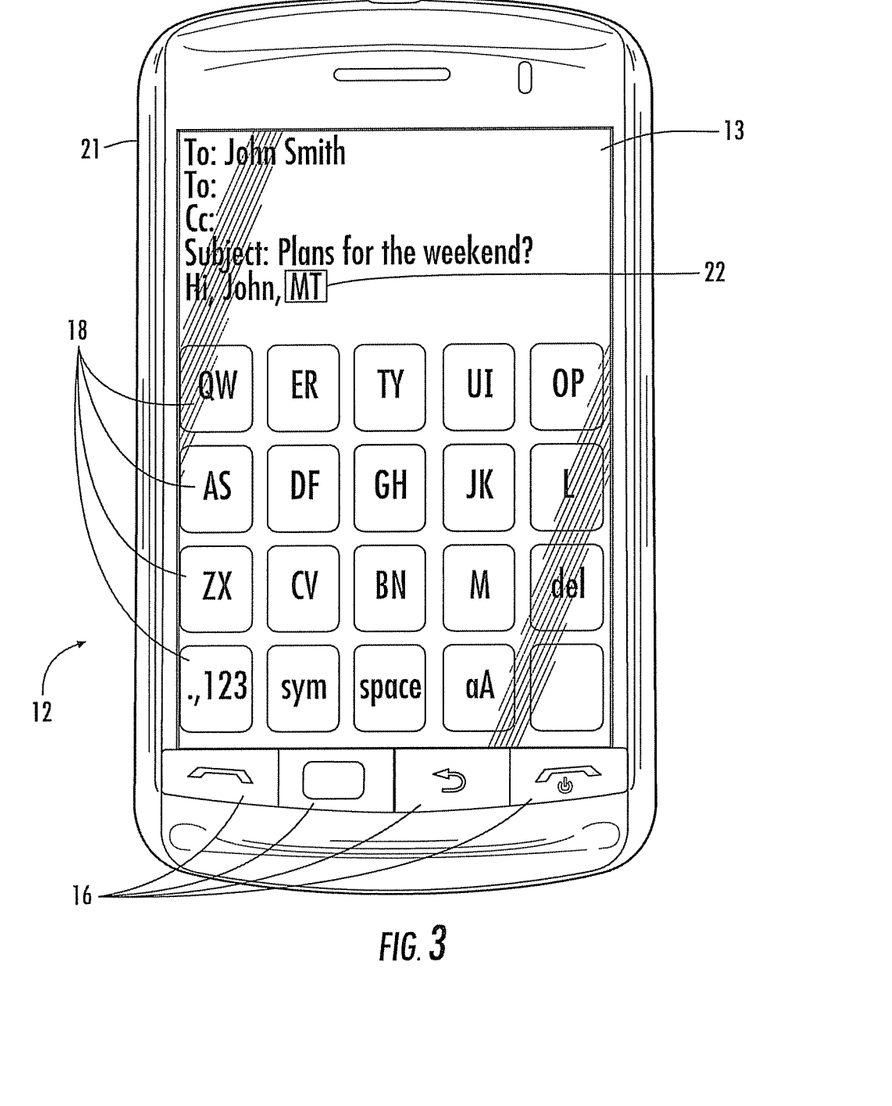
FIG. 3 shows the mobile wireless communications device of FIG. 1 in another non-predictive keyboard mode and displaying a cursor based thereupon.

When the accelerometer 19 detects that the mobile wireless communication device 12 is in a landscape orientation, the processor 17 illustratively displays a virtual keyboard 18 having a full set of QWERTY keys, as shown in FIG. 2. When the accelerometer 19 detects that the mobile wireless communication device 12 is in a portrait orientation, the processor 17 illustratively displays a virtual keyboard 18 having multiple different letters selectable from a single key, as shown in FIG. 3. The reason that more than one letter appears on some of the keys is so that less than a full set of QWERTY keys can be used to access all of the English alphabet letters. This advantageously allows the size of the keys displayed, when the mobile wireless communication device 12 is in a portrait orientation, to be of sufficient size to be convenient for users.

The tradeoff with placing multiple different letters on a single key is that typing may become slightly more difficult for users. To make typing easier, the processor 17 permits selection of a keyboard mode from among a plurality of different keyboard modes, at least one of the keyboard modes having multiple different letters selectable from a given key.

The processor 17 may permit selection of a keyboard mode based upon the keyboard 18, the input device 16, and/or the accelerometer 19. For example, the keyboard 18 and/or input device may be used to navigate to a keyboard mode selection menu. Further, movement of the mobile wireless communications device 12, such as changing the device from a landscape to a portrait orientation (discussed above), as detected by the accelerometer 19, may be used to select the keyboard mode.

At least one of the keyboard modes may be a non-predictive keyboard mode, called a multi-tap mode. In the multi-tap mode, a user enters a desired letter by pressing a given key a number of times corresponding to the position of the letter on the key. Thus, for example, for a user to enter a "W," he would press the QW key twice.

In addition, at least one of the keyboard modes may be a predictive keyboard mode, which will be discussed below in greater detail. Since the mobile wireless communications device 12 has the plurality of different keyboard modes, one concern is that a user may become confused as to which keyboard mode the device is in.

To address this potential concern and to enhance usability of the mobile wireless communications device 12, the processor 17 generates a respective different cursor 22 on the display 13 based upon the selected keyboard mode. For example, when the mobile wireless communications device 12 is in a QWERTY keyboard mode (shown in FIG. 2), the processor 17 illustratively generates the cursor 22 as a vertical line "|." This cursor indicates to a user that the mobile wireless communications device 12 is in a standard QWERTY keyboard mode.

When the mobile wireless communications device 12 is in a non-predictive multi-tap keyboard mode having multiple different letters selectable from a given key (as shown in FIG. 3), the processor 17 illustratively generates the cursor as a box with the letters "MT" inside, indicating to a user that the mobile wireless communications device 12 is in a non-predictive multi-tap keyboard mode.

Figure 4:
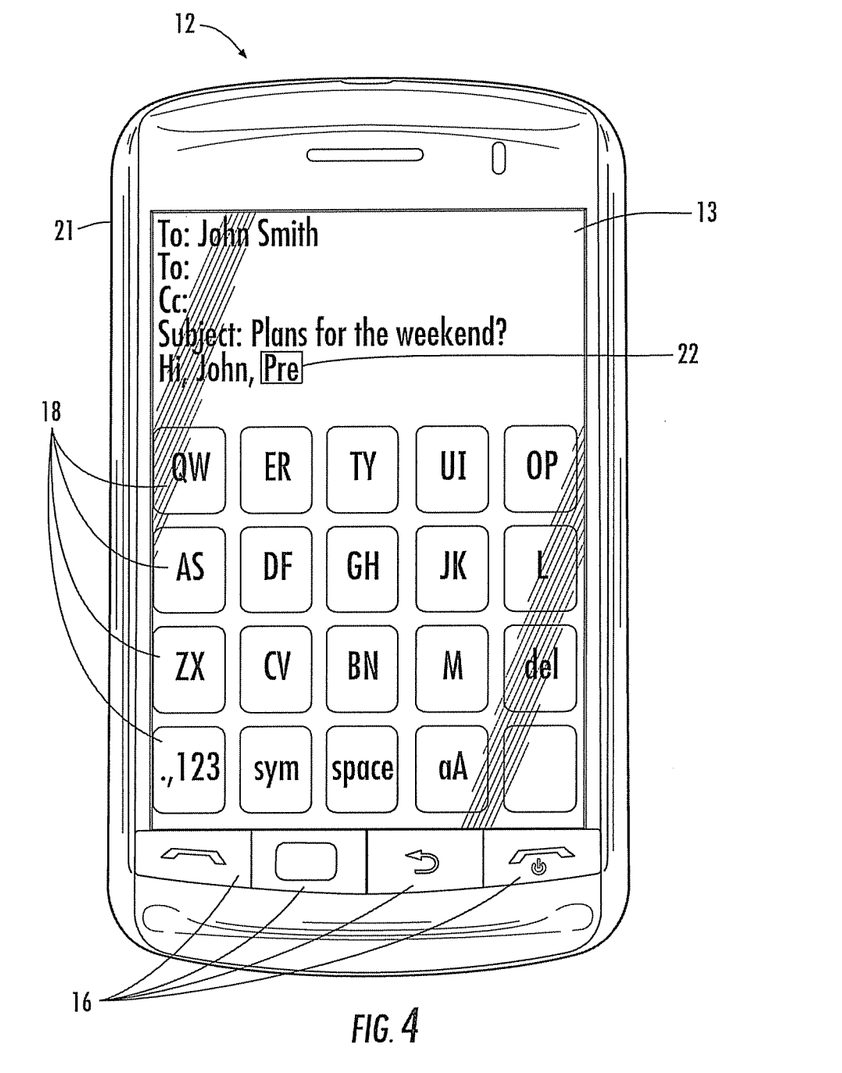
FIG. 4 shows the mobile wireless communications device of FIG. 1 in a predictive keyboard mode and displaying a cursor based thereupon.

As discussed above, at least one of the keyboard modes is a predictive keyboard mode. When the mobile wireless communications device 1 is in a predictive multi-tap keyboard mode having multiple different letters selectable from a given key (as shown in FIG. 4), the processor 1 illustratively generates the cursor as a box with the letters "Pre" inside, indicating to a user that the mobile wireless communications device 1 is in a predictive multi-tap keyboard mode.

Referring now additionally to FIGS. 5-8, another example embodiment of the mobile wireless communications device 32 is described having a traditional keyboard 38 rather than a virtual keyboard displayed on a touch screen. This mobile wireless communications device 32 includes a housing 41 carrying a processor 37 coupled to a display 33, wireless transceiver 34, a memory 35, a trackball 36, keyboard 38, and accelerometer 39. These components are similar to those of the mobile wireless communications device 12 discussed above. Accordingly, these components require no further discussion.

The keyboard 38 illustratively includes a plurality of multi-symbol keys (shown in FIG. 5), each having a plurality of respective letters, numbers, and/or symbols thereon. The keyboard 38 also illustratively includes an alternate function key and a shift key. When the shift key is activated, the next letter entered will be displayed as an uppercase version of that letter. When the alternate function key is activated, the number or symbol appearing on the next key activated will be displayed on the display 13.

Figure 5:
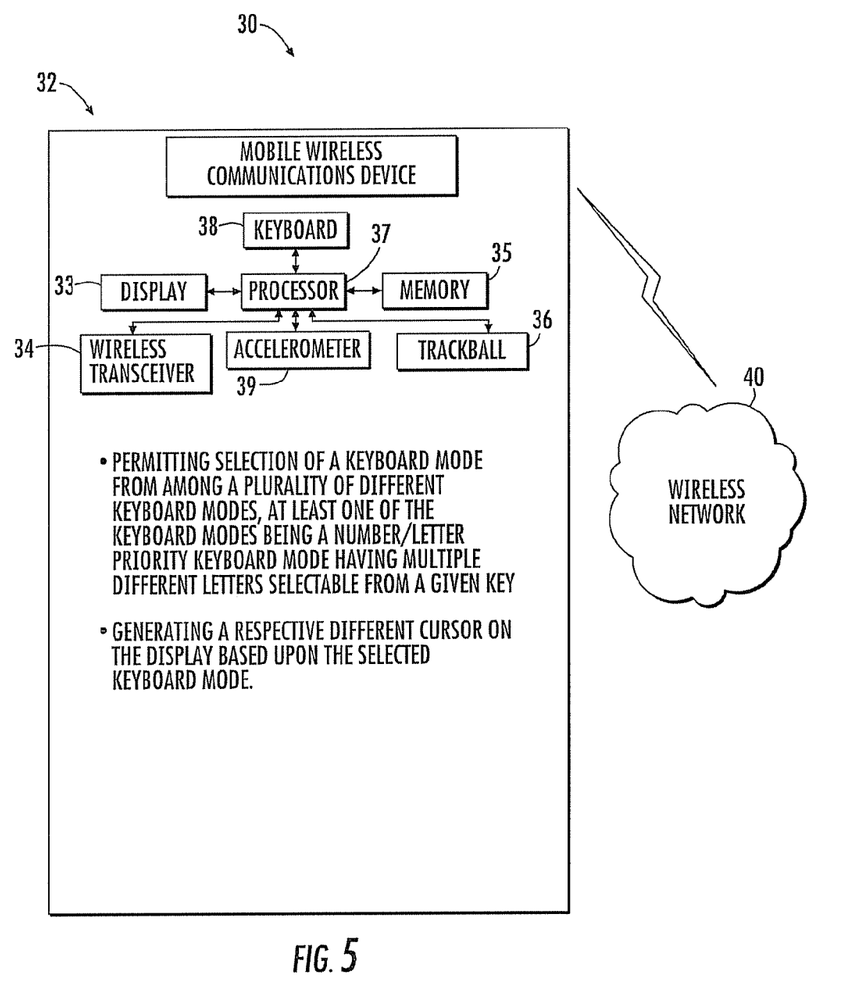
FIG. 5 is a schematic block diagram of a communications system including a mobile wireless communications device in accordance with an example embodiment of the present disclosure.

In the predictive keyboard mode, the processor 37 compares respective letters corresponding to actuated multi-letter keys to a list (e.g. dictionary) of words and/or phrases, which is stored in the memory. The processor 37 generates and displays on the display 33 a menu of possible desired words based upon the combination of keys that are pressed, as will be appreciated by those skilled in the art. The possible desired words may be generated according to various rules, such as a general frequency of use of the words, a frequency of use of the words by the user, alphabetically, etc., or a combination thereof.

Figure 6:
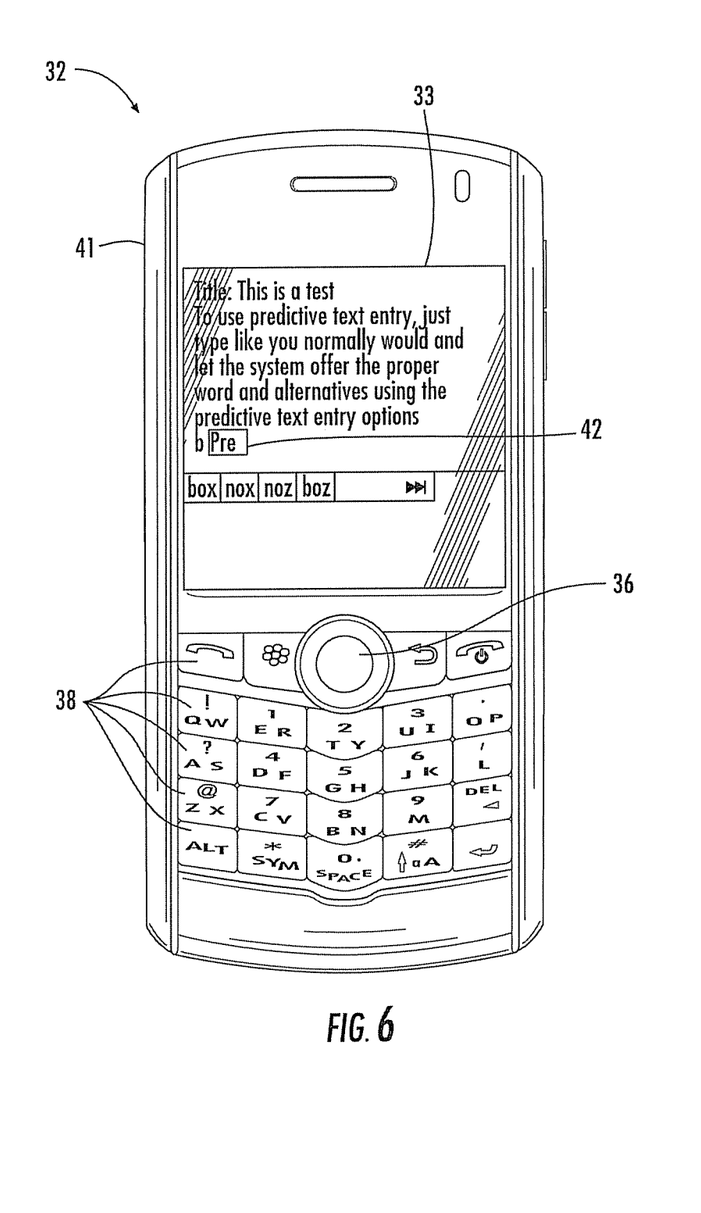
FIG. 6 shows the mobile wireless communications device of FIG. 5 in a predictive keyboard mode and displaying a cursor based thereupon.

Such a predictive keyboard mode is shown in FIG. 6. The cursor 42 appears a box with the letters "Pre" inside, indicating to a user that the mobile wireless communications device 32 is in a predictive multi-tap keyboard mode. For the current word being typed by the user, the processor 37 displays the text "b," which results in possible word choices of "box," "nox," "noz," and "boz," in the menu. The processor 37 illustratively causes the first word in the menu (e.g. "box") to be initially highlighted. The user may then use the trackball 36 to scroll through other words in the list. The user can select the highlighted word by pressing the trackball 36 inward, or by pressing the return key or space key, for example. Once a desired word is selected, the processor 37 inserts the selected word in the active document (e.g. an e-mail, memo, sms message, web page, etc.), and the process begins again when the user starts entering letters for a next word.

At least one of the keyboard modes may comprise a number/letter priority mode. In this keyboard mode, shown in FIG. 7, actuation of a key having both a number and a letter selectable therefrom will result in the processor 37 displaying the number on the display 33 rather than the letter, with no actuation of the alt key beforehand, contrary to the usual operation of the keyboard 38 (wherein the alt key is actuated prior to a key having both a number and a letter selectable therefrom when display of the number is desired). The cursor 42 appears a box with the number symbol "#" inside, indicating to a user that the mobile wireless communications device 32 is in the number/letter priority keyboard mode.

Figure 7:
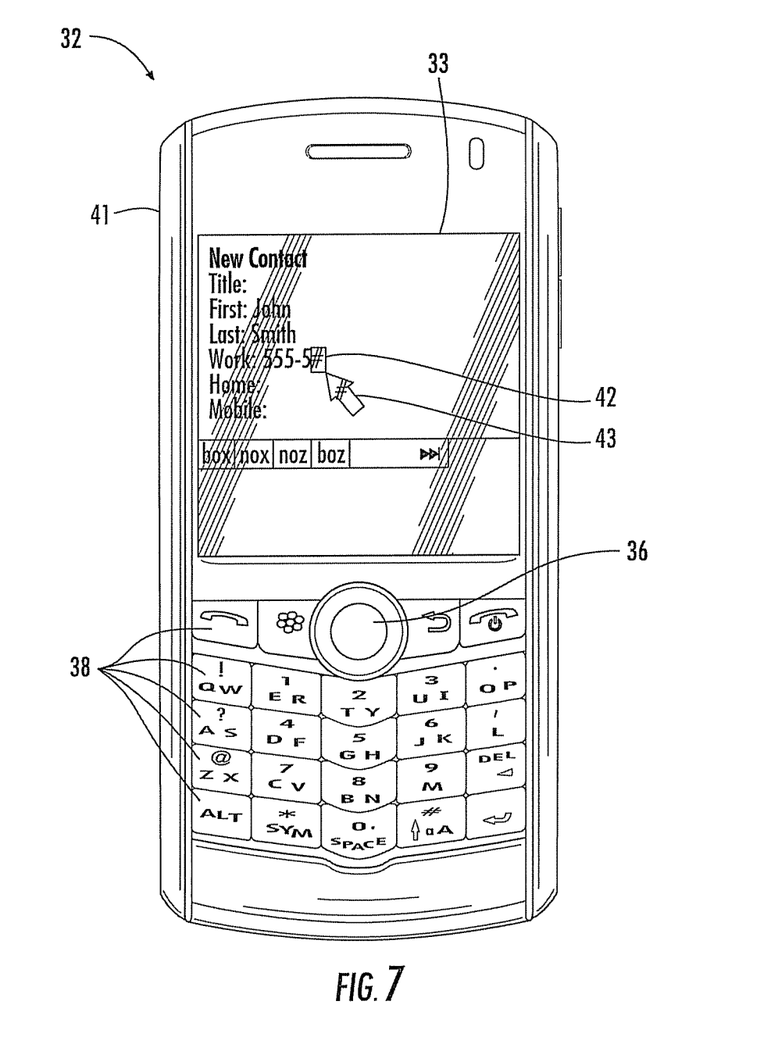
FIG. 7 shows the mobile wireless communications device of FIG. 5 in a number/letter priority keyboard mode and displaying a cursor based thereupon.
Figure 8:
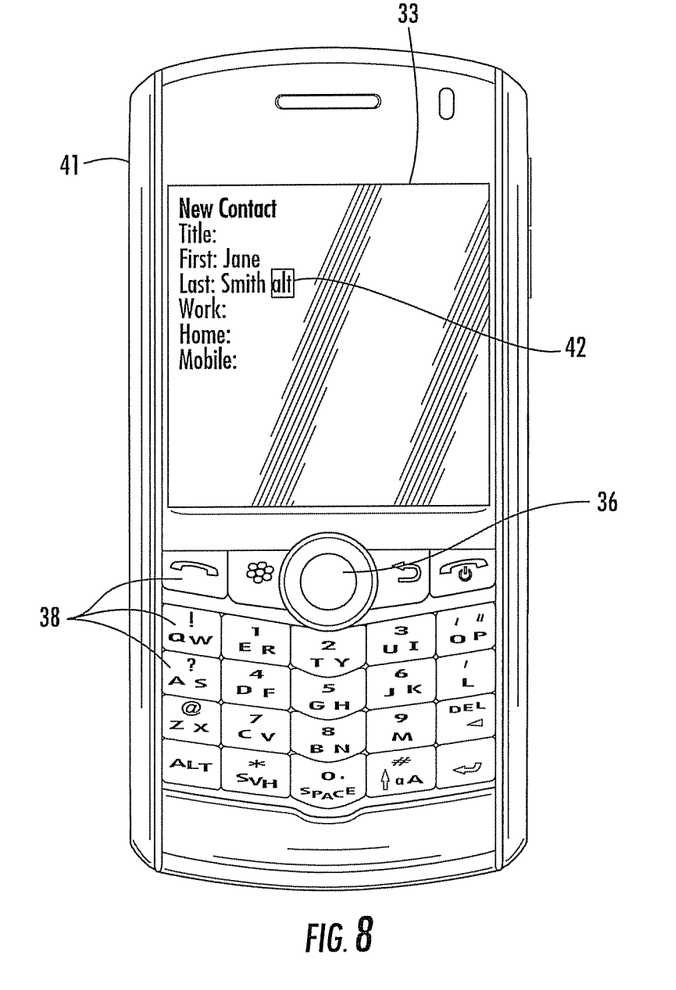
FIG. 8 shows the mobile wireless communications device of FIG. 5 in a symbol/letter priority keyboard mode and displaying a cursor based thereupon.

In addition to the text cursor 42, a pointing cursor 43 is also illustratively generated by the processor 37 in this keyboard mode. The pointing cursor also displays a number symbol "#" inside to further indicate to a user that the mobile wireless communications device 32 is in the number/letter priority mode. When in the number/letter priority mode, actuation of some or all keys not having numbers selectable therefrom may be ignored.

The pointing cursor 43 may be controlled via the trackball 36 and may be used to select a desired point on the display 33 to advance the text cursor 42 to. The pointing cursor 43 may also be used to select hyperlinks or other functions, as will be appreciated by those of skill in the art.

At least one of the keyboard modes may comprise a symbol/letter priority mode. In this keyboard mode, selected in FIG. 7, actuation of a key having both a symbol and a letter selectable therefrom will result in the symbol being displayed on the screen rather than the letter, with no actuation of the alt key beforehand, contrary to the usual operation of the keyboard 38 (wherein the alt key is actuated prior to a key having both a symbol and a letter selectable therefrom when display of the symbol is desired). The cursor 42 illustratively appears a box with the letters "alt" inside, indicating to a user that the mobile wireless communications device 32 is in the symbol/letter priority keyboard mode.

While the mobile wireless communications device 3 may be placed into the number/letter or symbol/letter priority keyboard modes via a direct selection thereof (choosing a keyboard mode from a menu, for example), the mobile wireless communications device may also be placed into the number/letter or symbol/letter priority keyboard modes based upon a selected data field. For example, when entering data about a new contact into the mobile wireless communications device 32 (shown in FIG. 7), there are multiple data fields to be filled—first name, last name, work telephone number, home telephone number, mobile telephone number, etc. When a data field to be filled with numbers is selected (the work number field, as selected in this example), the mobile wireless communications device 32 is placed into the number/letter priority keyboard mode.

Selection of a different data field may then switch the mobile wireless communications device 32 to a different keyboard mode. Further, positioning of the pointing cursor 43 over a data field may result in the processor dynamically changing the pointing cursor to reflect what keyboard mode the device will be switched to upon selection of that data field.

Those of skill in the art will understand that other suitable keyboard modes may be selectable. For example, a shift keyboard mode and a caps-lock keyboard mode may be selectable and a cursor may be generated based thereupon. In addition, a language mode may be selectable (e.g. English, Spanish, French) and a cursor may be generated based thereupon. That is, a cursor may be generated to reflect which language the mobile wireless communications device 32 is currently using. Further, any suitable keyboard configuration may be used.

Example components of a hand-held mobile wireless communications device 1000 that may be used in accordance with the present disclosure are further described in the example below with reference to FIG. 9. The device 1000 illustratively includes a housing 1200, a keypad 1400 and an output device 1600. The output device shown is a display 1600, which may comprise a full graphic LCD. In some example embodiments, display 1600 may comprise a touch-sensitive input and output device. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user. In some example embodiments, keypad 1400 may comprise a physical keypad or a virtual keypad (e.g., using a touch-sensitive interface) or both.

The housing 1200 may be elongated vertically, or may take on other sizes and shapes (including clamshell housing structures). The keypad 1400 may include a mode selection key, or other hardware or software for switching between text entry and telephony entry.

Figure 9:
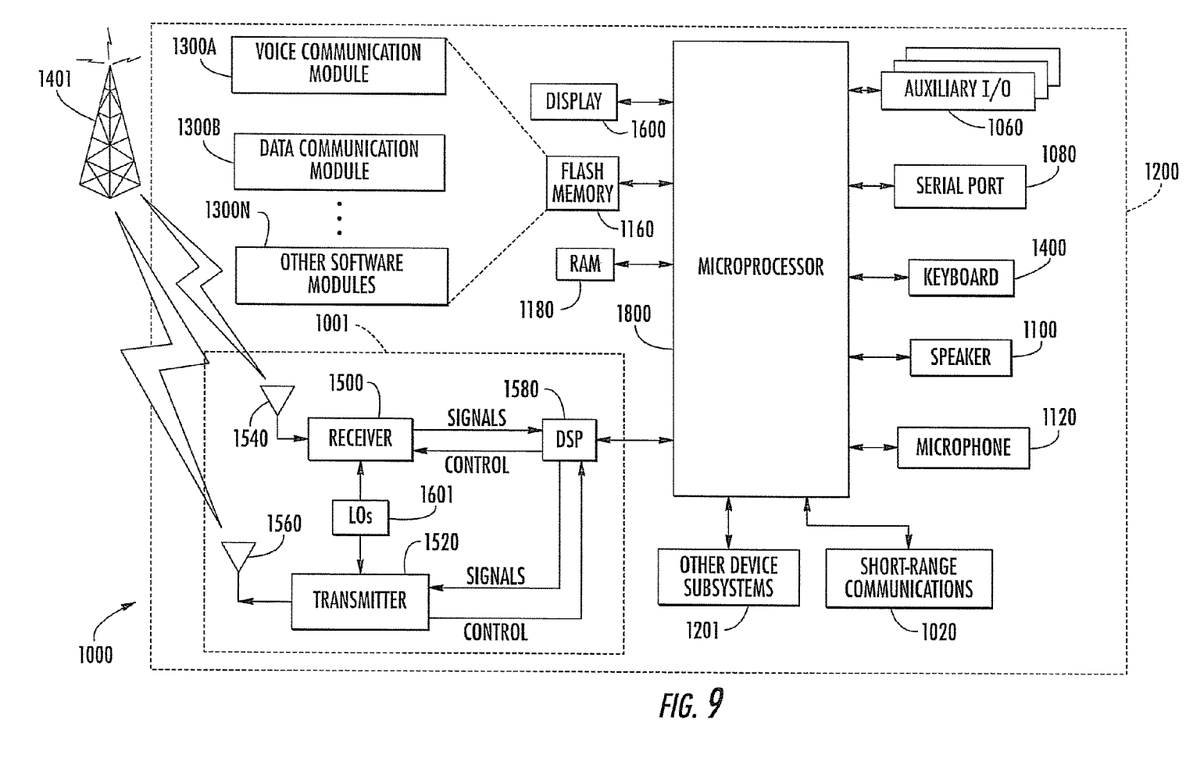
FIG. 9 is a schematic block diagram illustrating components of a mobile wireless communications device in accordance with an example embodiment of the present disclosure.

In addition to the processing device 1800, other parts of the mobile device 1000 are shown schematically in FIG. 9. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having voice and data communications capabilities. In addition, the mobile device 1000 may have the capability to communicate with other computer systems via the Internet.

Operating system software executed by the processing device 1800 may be stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3G, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore utilizes a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, track ball, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other example embodiments of the disclosure will come to the mind of one skilled in the art having the benefit of the teachings presented in the foregoing descriptions and the associated drawings. Therefore, it is understood that the disclosure is not to be limited to the specific example embodiments disclosed, and that modifications and example embodiments are intended to be included within the scope of the appended claims.

That which is claimed is:

1. A mobile wireless communications device comprising:
   a touch-sensitive display;
   a virtual keyboard to be displayed on the touch-sensitive display in at least a first orientation and a second orientation different from the first orientation;
   a device orientation sensor;
   the processor cooperating with the display and the device orientation sensor, to
      permit selection of a keyboard mode from among a plurality of keyboard modes, one of the keyboard modes having multiple different letters selectable from a given key when the virtual keyboard is displayed in the first orientation, and one of the keyboard modes being a QWERTY keyboard when the virtual keyboard is displayed in the second orientation, and
      generate a first cursor to indicate the selected keyboard mode having multiple different letters selectable from the given key when the virtual keyboard is displayed in the first orientation, and a second cursor, different from the first cursor, to indicate the selected keyboard mode being a QWERTY keyboard.

2. The mobile wireless communications device of claim 1 wherein at least one of the keyboard modes comprises a predictive text entry mode.

3. The mobile wireless communications device of claim 1 wherein at least one of the keyboard modes comprises a non-predictive text entry mode.

4. The mobile wireless communications device of claim 1 wherein at least one of the keyboard modes comprises a number/letter priority keyboard mode.

5. The mobile wireless communications device of claim 1 wherein at least one of the keyboard modes comprises a symbol/letter priority keyboard mode.

6. The mobile wireless communications device of claim 1 wherein the cursor comprises a text cursor.

7. The mobile wireless communications device of claim 1 wherein the cursor comprises a pointing cursor.

8. A mobile wireless communications device comprising:
a touch-sensitive display;
an input device;
a virtual keyboard to be displayed on the touch-sensitive display in at least a first orientation and a second orientation different from the first;
a device orientation sensor;
a processor cooperating with the display and the device orientation sensor to
permit selection of a keyboard mode from among a plurality of keyboard modes based upon at least one of the virtual keyboard, the device orientation sensor and the input device, one of the keyboard modes is displayed in the first orientation and one of the keyboard modes being a QWERTY keyboard is displayed in the second orientation, and
generate a first cursor to indicate the selected keyboard mode having multiple different letters selectable from a given key when the virtual keyboard is displayed in the first orientation, and a second cursor, different from the first cursor, to indicate the selected keyboard mode being a QWERTY keyboard.

9. The mobile wireless communications device of claim 8 wherein at least one of the keyboard modes comprises a non-predictive text entry mode.

10. The mobile wireless communications device of claim 8 wherein at least one of the keyboard modes comprises a number/letter priority keyboard mode.

11. The mobile wireless communications device of claim 8 wherein at least one of the keyboard modes comprises a symbol/letter priority keyboard mode.

12. A method of displaying a cursor on a touch-sensitive display of a mobile wireless communications device comprising a virtual keyboard to be displayed on the touch-sensitive display in at least a first orientation and a second orientation different from the first, an input device, a processor, a device orientation sensor and a wireless transceiver cooperating with the processor to perform a wireless communication function, the method comprising:
permitting selection of a keyboard mode of the keyboard from among a plurality of keyboard modes based upon at least one of the virtual keyboard, the device orientation sensor and the input device, one of the keyboard modes is displayed in the first orientation and one of the keyboard modes being a QWERTY keyboard is displayed in the second orientation; and
generating a first cursor to indicate the selected keyboard mode having multiple different letters selectable from a given key when the virtual keyboard is displayed in the first orientation, and a second cursor, different from the first cursor, to indicate the selected keyboard mode being a QWERTY keyboard.

13. The method of claim 12 wherein at least one of the keyboard modes comprises a predictive text entry mode.

14. The method of claim 12 wherein at least one of the keyboard modes comprises a non-predictive text entry mode.

15. The method of claim 12 wherein at least one of the keyboard modes comprises a number/letter priority keyboard mode.

* * * * *